United States Patent [19]

Marrone

[11] 3,916,094

[45] Oct. 28, 1975

[54] SUBMERSIBLE VISUAL SIMULATOR FOR REMOTELY PILOTED SYSTEMS

[75] Inventor: Frederick A. Marrone, San Diego, Calif.

[73] Assignee: The United States of America as represented by the Secretary of the Navy, Washington, D.C.

[22] Filed: June 21, 1974

[21] Appl. No.: 481,574

[52] U.S. Cl. ................ 178/6; 178/6.8; 178/DIG. 1; 178/DIG. 21; 178/DIG. 35; 178/DIG. 38

[51] Int. Cl.[2] ............................................ H04N 7/18

[58] Field of Search ............ 178/DIG. 1, DIG. 35, 6, 178/6.8, DIG. 38, DIG. 21, 6.5

[56] References Cited

UNITED STATES PATENTS

| | | | |
|---|---|---|---|
| 3,205,303 | 9/1965 | Bradley | 178/6.8 |
| 3,780,220 | 12/1973 | Fugitt | 178/6.8 |
| 3,862,358 | 1/1975 | Wolff | 178/6.8 |

*Primary Examiner*—Albert J. Mayer
*Assistant Examiner*—Edward L. Coles
*Attorney, Agent, or Firm*—Richard S. Sciascia; Ervin J. Johnston; William T. Skeer

[57] ABSTRACT

A visual simulator for obtaining the illusion of control presence in a remotely controlled vehicle comprises two television camera systems which are coupled to a cathode ray tube display carried by the head gear of the operator of the remote controlled vehicle. A video mixer or switch combines the images recorded by the two television camera systems into a single display. A position sensor attached to the helmet worn by the operator is connected to the video mixer to control the position of the scenes recorded by the two television camera systems on the cathode ray tube display.

12 Claims, 3 Drawing Figures

SUBMERSIBLE VISUAL SIMULATOR FOR REMOTELY PILOTED SYSTEMS

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of electro-optics. More specifically, this invention pertains to the field of television monitors. In still greater particularity, this invention is directed to the use of television in a remote control environment. Further, the invention relates to a television monitoring system which provides a view to the exterior of a remote controlled vehicle while, at the same time, providing a view of the control instruments for said vehicle. In still greater particularity, but without limitation thereto, this invention pertains to a closed-circuit stereoscopic television monitoring system.

DESCRIPTION OF THE PRIOR ART

A variety of composite video displays are known in the prior art and are used for artistic and training purposes. Exemplary of such systems is U.S. Pat. No. 3,525,804 granted on Aug. 25, 1970 to J. R. Owen for "Gated Video Display". Further, the use of head controlled direction of a remote television system by an operator thereof has been fairly suggested in the past. As an example of such prior art embodiments, attention is invited to U.S. Pat. No. 3,504,122 granted on Mar. 31, 1970 to Harvey L. Ratliff, Jr. for "Stereoscopic Television Systems With Means to Control the Camera Movement from a Remote Location." Such systems, while having limited success, fall short of providing a desired, natural perspective or presence that would be afforded if the operator were, in fact, present in the remotely controlled vehicle.

The failure to provide adequate presence illusion is attributed to the fact that the view afforded by the remote cameras is presented to the viewer operator at all times and no view of the interior of the vehicle is afforded to permit the operator to perceive the position of controls, instruments, and other detail.

SUMMARY OF THE INVENTION

This invention overcomes the aforestated deficiencies of the prior art by providing a head controlled television monitoring system in which two television cameras are employed. The first camera is mounted on a remotely controlled vehicle to provide the customary exterior view from said vehicle. The second television camera is directed toward a control console for the vehicle. Of course, the control console may be at the operator's position and the instruments and control positions thereon may be telemetered to the vehicle. The illusion of presence is further enhanced by combining the two views from the respective television cameras into a single cathode ray display. The two images are mixed in the cathode ray tube display in dependence upon a sensed position of the operator's head. Thus, when the operator looks forward, he is presented a view of the exterior of the vehicle. However, when he moves his head in a predetermined direction to a predetermined position, the view afforded by the television camera monitoring console is presented on the viewing cathode ray display. In this fashion, an illusion of looking out a transparent, canopied cockpit on the front of the remote controlled vehicle is created with the control console placed adjacent said canopy.

STATEMENT OF THE OBJECTS OF INVENTION

It is an object of this invention to provide an improved TV monitor system.

A further object of this invention is the provision of a TV monitoring system adapted for use in remote controlled vehicles.

A further object of this invention is the provision of a stereoscopic television system.

Another object of this invention is to provide a stereo-scopic television system for use in remotely controlled vehicles to enhance the control presence of said vehicles.

These and other objects of the invention will become more readily apparent from the ensuing specification when taken with the drawings.

DESCRIPTION OF THE PREFERRED EMBODIMENT

Figure 1:
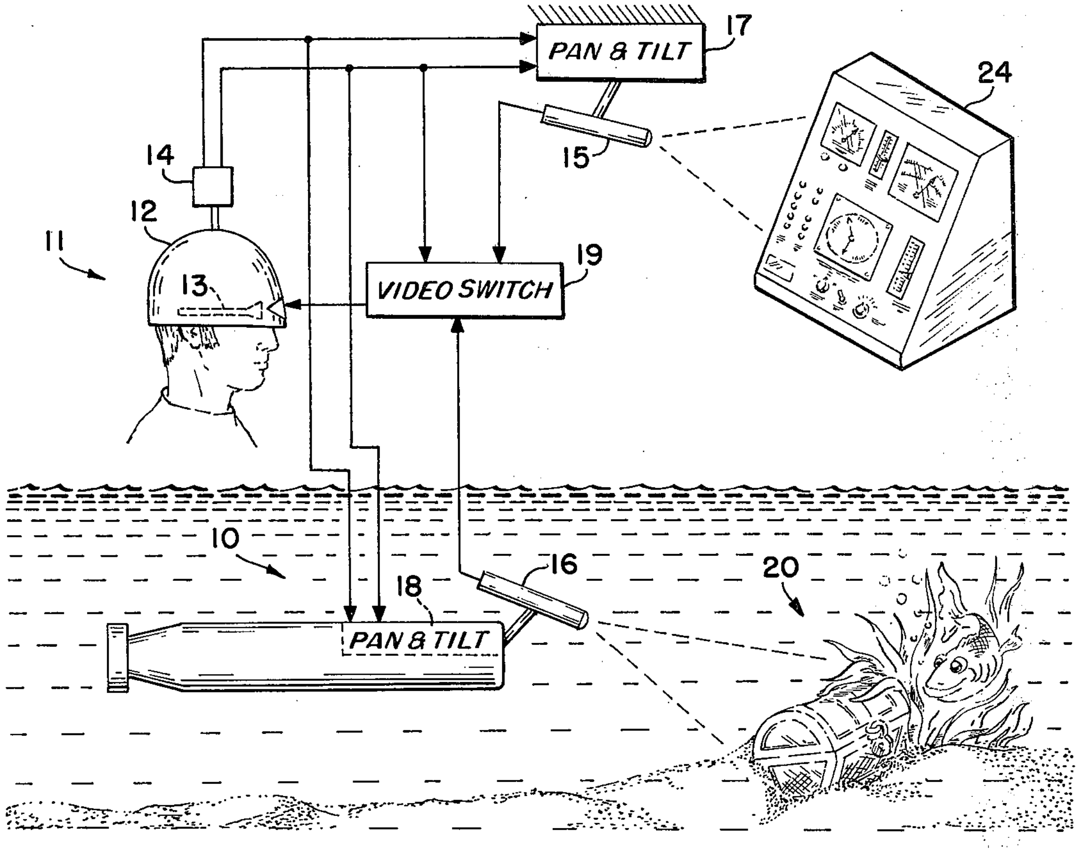
FIG. 1 is a partially schematic representation of the major components comprising the invention including control interconnection thereof.

Referring to FIG. 1, a submersible vehicle 10 is controlled by an operator 11. Operator 11 wears appropriate headgear 12 containing miniature cathode ray display devices 13 which are positioned physically or optically to provide a picture for each eye of operator 11. A sensor 14 is connected to helmet 12 to detect the position thereof and convert such mechanical movement as detected thereby into suitable electronic control signals. These control signals may be DC control voltages or an AC servo motor control signal. These motions, both horizontal and vertical, are coupled to pan and tilt camera mounts 17 and 18 which carry cameras 15 and 16, respectively.

Mounts 17 and 18 may be any conventional, remote controlled pan and tilt camera mounts and could be, for example, that disclosed in U.S. Pat. No. 3,757,042 issued on Sept. 4, 1973 to Clarence J. Funk for "Pan and Tilt Underwater Optical Viewing System With Adjustable Source-Receiver Separation and Zoom Lenses."

Camera 15 is directed to record a view of a control console 24. Because control console 24 is frequently a rather large object, it is usually placed on the surface nearby the operating position of operator 11. Of course, other locations are possible, including within submersible vehicle 10. This freedom of positioning of console 24 is a feature of the invention which permits it to be adapted to existing remotely controlled vehicles. For example, this system could be used with good advantage on such a vehicle as described in U.S. Pat. No. 3,780,220, issued on Dec. 18, 1973 to Ronald B. Fugitt et al., for "Remote Control Underwater Observation Vehicle."

In the operational environmental illustrated in FIG. 1, the vertical sensed control signal is also coupled to a video switch 19. Video switch, or mixer, 19 combines the view from cameras 15 and 16 for presentation in a single composite display by cathode ray tube display 13. The details of this combination will be more fully explained in the following discussion. However, it should be noted that such composite displays are well understood in the video graphic arts as represented by the aforecited U.S. Patent to J. R. Owen.

Figure 2:
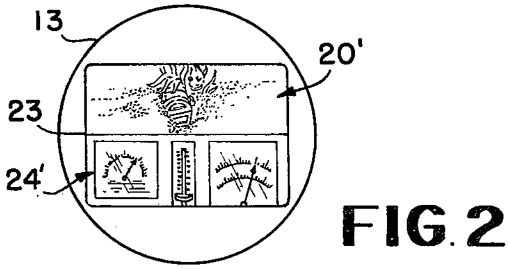
FIG. 2 is a representation of the view afforded operator of the invention of FIG. 1.

Referring to FIG. 2, the picture presented by the face of cathode ray display 13 is illustrated. As shown, the upper portion of the display indicated at 20' is a representation of the scene 20 recorded by camera 16. A line of demarcation 23 separates the view 20' from view 24' which, of course, is the control console as recorded by camera 15. It will be noted that only the upper portion of console 24 is included in the illustrated arrangement. Should operator 11 lower his head, the line of demarcation 23 would move in an upward direction and the remaining portions of control console 24 would be visible. In this arrangement, an illusion of a control console placed below a canopied window on submersible 10 is created. Of course, other placements of the control console would be possible. Thus, switch 19 could be arranged such that an illusion of an overhead control console is created. Similarly, by utilizing horizontal position detectors to control the mixing of the two video images, an illusion of a control console placed horizontally adjacent to the viewing canopy could be created similarly.

Figure 3:
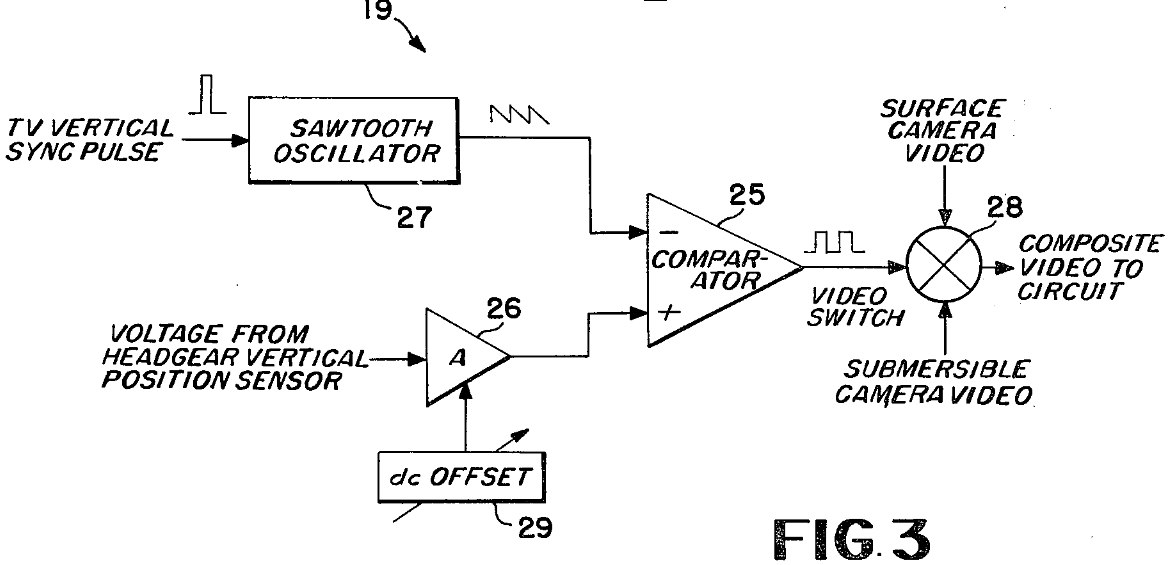
FIG. 3 is a diagrammatic illustration of video switching arrangement illustrated in FIG. 1.

Referring to FIG. 3, the details of video switch, or mixer, 19 are illustrated in greater detail. A sawtooth oscillator 27 receives the vertical synchronization pulse from a television monitor system and generates a sawtooth voltage which represents the vertical extent of the displayed cathode ray tube display. The voltage from detector 14 is fed to an appropriate control amplifier 26 which also receives a DC offset voltage 27 to establish a control lever which is fed with sawtooth output from sawtooth oscillator 27 to a comparator 25. When the sawtooth output from the sawtooth oscillator 27 exceeds this reference voltage, a video switch 28 is controlled to pass the video signal from surface camera 15 to the cathode ray display 13, FIG. 1. During times when the sawtooth voltage is equal to or does not exceed the referenced voltage provided by control amplifier 26, video switch 28 is conditioned to pass the video signal from submersible camera 16 to the composite video CRT As illustrated, the DC offset voltage 27 is adjustable, by conventional means such as a potentiometer, to establish a reference cross over control voltage. The effect of moving this control to establish a different offset voltage would be to raise or lower the apparent top or windowsill 23 of the canopy. This control may be set for different operators to accommodate their natural sitting and viewing positions.

The foregoing description of the component portions comprising this invention are sufficient to enable a person skilled in the underwater instrumentation arts to make and use the invention. However, choices as among components and other design parameters will be better understood by reference to the following preferred mode of operation.

PREFERRED MODE OF OPERATION

In operating the device of the invention, operator 11 dons helment 13 and positions the cathode ray tube display 13 to provide a visual representation. The DC offset voltage 27 is then controlled to produce natural sill height to create an illusion of looking out the window in the forward portion of submersible vehicle 10. Operator 11 then controls the positon of submeresible vehicle 10 by conventional telemetered control arrangements to position a vehicle 10 in the vicinity of a desired object for field of view such as indicated generally at 20 in FIG. 1. The various vehicle operational parameters and control interactions are transmitted to console 24 by conventional telemetry lengths such that if operator 11 desires to obtain information, such as, for example, the depth and position of the viewed scene, he lowers his head in a natural fashion to read such parameters of the vehicles's operation on console 24. In this fashion a natural illusion of control presence is obtained.

The foregoing description, taken together with the claims constitute a disclosure such as to enable a person skilled in the electronics and oceanographic instrumentation arts and having the benefit of the teachings contained therein to make and use the invention. Further, the structure herein described meets the objects of invention, and generally constitutes a meritorious advance in the art unobvious to such a person not having the benefit of these teachings.

Obviously, many modifications and variations of the present invention are possible in the light of the above teachings, for example, ordinary two-dimensional television cameras may be used in place of the stereoscopic cameras described and it is therefore understood that within the scope of the disclosed inventive concept, the invention may be practiced otherwise than specifically described.

What is claimed is:

1. A visual simulator for obtaining an illusion of control presence in a remotely viewed scene comprising:

a helmet adapted to be affixed to the head of a viewer;

position sensing means effectively attached to said helmet to sense the position of the head of a viewer wearing said helmet;

cathode ray display means carried by said helmet and effectively positioned to comprise the entire field of view of the wearer of said helmet excluding other visual stimuli;

a first TV camera having pan and tilt motors which are effectively connected to said position sensing means to direct the view of said camera in directions corresponding to the direction of view of the wearer of said helmet;

a control console having instruments and controls thereon to be viewed and operated by the wearer of said helmet to remotely control an aspect of the scene recorded by said first television camera;

a second TV camera having pan and tilt motors which are effectively connected to said position sensing means to direct the view of said camera in directions corresponding to the direction of view of the wearer of said helmet; and positioned to record said control console;

a video switch means connected between said first and second TV cameras and said cathode ray display means and connected to said position sensing means for control of the relative amounts of view presented to the the cathode ray display means by each of said first and second TV cameras, whereby an illusion of a control cockpit is presented the wearer of said helmet.

2. A visual simulator according to claim 1 wherein said first TV camera is mounted for controlled movement on a submersible vehicle controlled by said console.

3. A visual simulator according to claim 2 wherein said video switch is connected to said position sensing means to respond to the vertical movement of the helmet of the wearer thereof.

4. A visual simulator according to claim 3 in which said video switch means positions the view recorded by said second TV camera below that recorded by said first TV camera to produce the illusion of desk type console with a view over the top thereof.

5. A visual simulator according to claim 4 in which said video switch is connected to said helment via a voltage comparator.

6. A visual simulator according to claim 5 in which said voltage comparator compares the voltage derived from a sawtooth generator which synchronized with the vertical synchronization pulse of said first and second TV cameras and a DC control voltage derived from the aforesaid position sensing means.

7. A visual simulator according to claim 6 in which said first and second TV cameras and said cathode ray display means comprise a stereoscopic TV system.

8. A visual simulator according to claim 1 wherein said video switch is connected to said position sensing means to respond to the vertical movement of the helmet of the wearer thereof.

9. A visual simulator according to claim 8 in which said video switch means positions the view recorded by said second TV camera below that recorded by said first TV camera to produce the illusion of desk type console with a view over the top thereof.

10. A visual simulator according to claim 1 in which said video switch is connected to said helmet via a voltage comparator.

11. A visual simulator according to claim 10 in which said voltage comparator compares the voltage derived from a sawtooth generator which synchronized with the vertical synchronization pulse of said first and second TV cameras and a DC control voltage derived from the aforesaid position sensing means.

12. A visual simulator according to claim 1 in which said first and second TV camera and said cathode ray display means comprise a stereoscopic TV system.

* * * * *